United States Patent Office 3,304,619
Patented Feb. 21, 1967

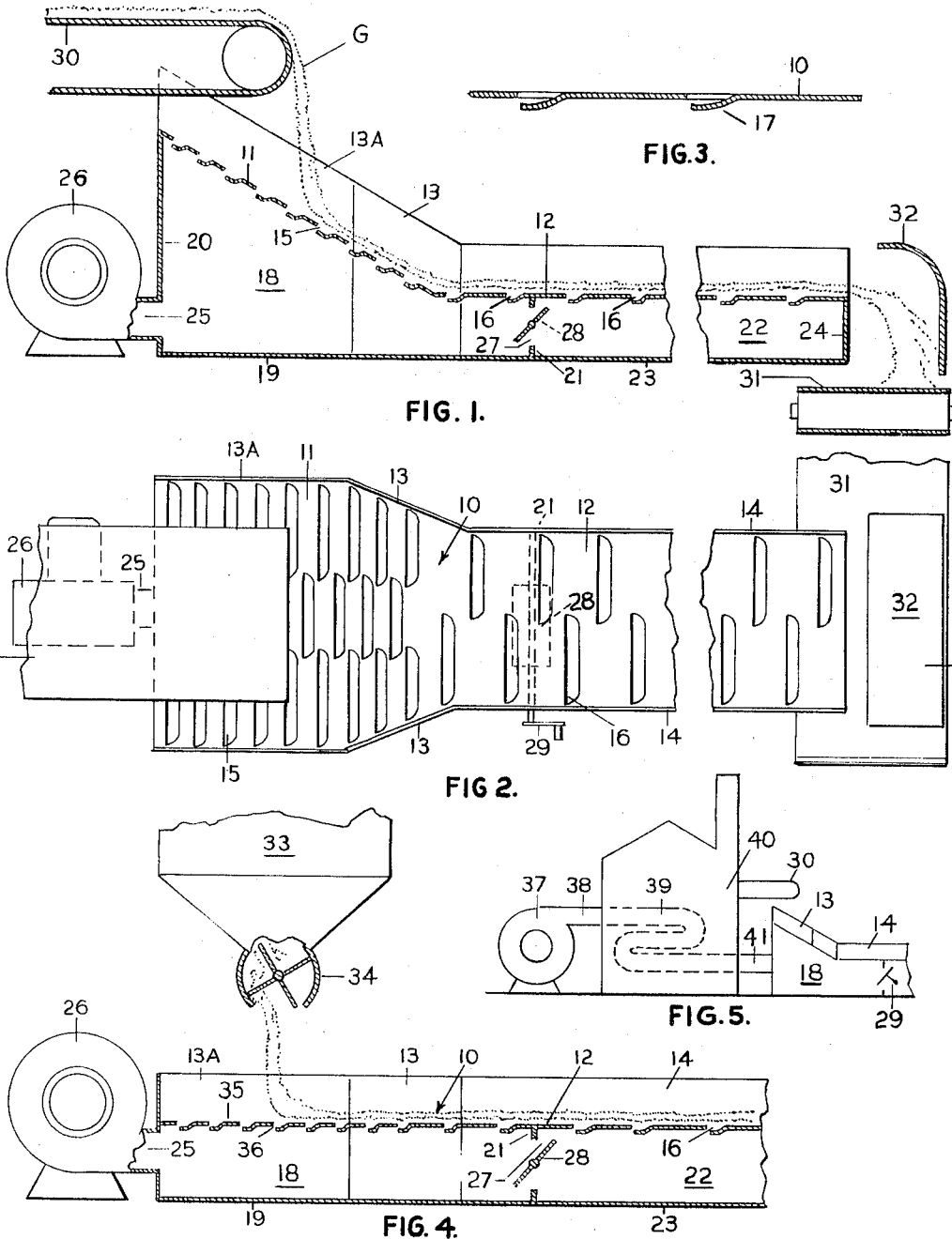

3,304,619
METHOD AND MEANS FOR CHANGING THE TEMPERATURE OF GRANULAR MATERIAL BY GAS JETS
Rudolph E. Futer, 1401 Eastshore Highway,
Piedmont, Calif. 94710
Filed Jan. 27, 1965, Ser. No. 428,315
10 Claims. (Cl. 34—10)

The invention relates to a method and apparatus for changing the temperature of granular materials, either cooling or heating them, by gas jets which propel said materials over an elongated table and have temperatures different from the initial temperatures of said materials. The invention is applicable, for example, to cooling such solid materials as sand, cement clinker, ground cement, and other materials that occur in solid form, as well as to heating such and other particled solid objects.

It is known to heat or cool objects by moving them through a duct or tunnel through which hot or cold air, respectively, is flowed. However, the rate of change in the temperature of the objects, for a given temperature difference between the objects and the air, was low, and very great temperature differentials between the objects and the air and/or excessively long residence times within the duct or tunnel were required to effect the desired temperature change.

A drawback of prior attempts to alter the temperature of solid objects by gas jets has been that the jets did not effectively disrupt the boundary layer or film of gas enveloping the objects, save at occasional sites along the duct or tunnel. To attain relative movement of the temperature-conditioning gas and the objects of sufficient intensity to affect the boundary layer would, with prior arrangements, have required excessively high jet velocities, leading to high gas compression costs. Also, the temperature-conditioning jets in the prior practice did not usually sweep the objects at the best angles to attain a high relative velocity between the gas and the object. In this connection, it may be noted that a gas jet moving essentially perpendicularly to a surface results in the accumulation of a pocket of gas within the jet envelope that moves slowly relatively to the object, whereby the gas sweeps the object surface at a velocity that is less than that of gas jet before it strikes the object. Such a jet is ineffective to, or inefficient in, overcoming the boundary layer on the object and leads to poor heat transfer between the gas and the solid object.

Regarding the above-mentioned pockets of reduced relative gas-flow velocity, reference is made to page 119 of Fan Engineering, 6th Edition (1961) published by Buffalo Forge.

It was discovered that objects transported on an airlift conveyor of the type described in my U.S. Patent No. 3,131,974, issued May 5, 1964, are rapidly cooled when moved over relatively short distances. This observation led to the present invention, wherein, in the preferred embodiment, gas jets of the type produced in the apparatus of the aforesaid patent are used to change the temperature of granular objects.

The conveyor of the aforesaid patent, although in itself capable of altering the temperature of granular material, was not designed or adapted for the purpose of temperature-conditioning, in which the object is not primarily that of moving objects but of subjecting the greatest feasible quantity of materials to the temperature-conditioning gas jets and attaining the greatest temperature change in the shortest time or travel distance. More particularly, when the principal purpose of moving objects on such a conveyor is to alter the temperature of the objects, a high feed rate of the objects is desirable; also, the gas jets are preferably such that they sweep the objects so as to effect a rapid change in temperature, and a minimum length of the conveyor table is desirable.

The present invention provides a method and means of flowing a large stream of granular material on a gas-jet conveyor for altering the temperature of the material by providing an acceleration zone onto which the material is fed, preferably downwardly with no or only low horizontal downstream velocity, and within which zone it is accelerated by acceleration jets to or nearly to the velocity with which it moves through a temperature-conditioning zone. Within the latter zone the material is moved downstream by temperature-conditioning gas jets which have temperatures materially different from the temperature of the material, and the gas flows relatively to said material with such velocity that the material is rapidly cooled or heated.

By limiting the downstream velocity of the granular material fed onto the acceleration zone of the table a very high relative velocity between the acceleration gas jets and the granular objects prevails within the said zone, and this was found to produce a very rapid change in temperature within said zone, provided that the gas temperature was materially different from that of the objects. Stated otherwise, the rate of temperature change in the granular objects, related to time, in the preferred embodiment of the invention, is greater in the acceleration zone than in the temperature-conditioning zone. Hence, in the preferred embodiment, the latter functions principally to further reduce or increase the temperature of the material to the desired final temperature.

More particularly, according to the preferred embodiment of the invention, the granular material is fed downwardly onto the feed zone or area of an elongated table which includes, downstream from the feed zone, a longitudinally elongated temperature-conditioning zone or area, the table being provided in both of said zones with passages which are inclined in the downstream direction, and gas is supplied to one or more plenum chambers situated beneath the table to produce acceleration gas jets in the feed zone for imparting horizontal velocity to and accelerate the objects for movement onto the conditioning zone, and to produce temperature-conditioning jets within the conditioning zone that move the material along the conditioning zone, the temperature of the gas jets within at least one of said zones being materially different from that of the objects engaged thereby. Because the more rapid temperature change occurs in the acceleration zone, it is in most instances preferred that the acceleration gas jets have a material temperature difference; however, the temperature change can be effected more gradually by having only the gas jets within the conditioning zone at a materially different temperature from that of the objects.

The number and/or the size of the passages and/or the pressure at which gas is supplied to the undersides of the two zones, are such that the kinetic energy of the gas jets, parallel to the table and reckoned per unit area of the table, is greater in the feed zone than in the conditioning zone. Typically, the said kinetic energy of the jets per unit table area is between 2 and 5 times as great in the acceleration zone as in the conditioning zone.

The higher relative kinetic energy of the gas jets in the feed zone is attained by providing a greater number of passages per unit area through the feed zone of the table than through the temperature-condition zone and/or by providing greater passages for gas in the former zone and/or by supplying gas at a higher pressure to the former zone than to the latter zone. In the example to be illustrated, both the first and third expedients are used.

The relatively greater rate of cooling or heating of the granular material by the acceleration gas jets in comparison to the conditioning jets when both sets of jets have about the same temperature is herein referred to as "flash cooling," although it will be understood that rapid heating may be achieved by the same phenomenon and is to be included in the quoted expression.

Further, to simplify the equipment provided to supply the gas, the same gas source is employed for the two zones of the table. For example, the gas may be supplied at a high pressure to a plenum chamber beneath the feed or acceleration zone and, optionally, beneath the upstream part of the temperature-conditioning zone, and a part of the gas is flowed thence through a flow restriction (optionally controllable) into a second plenum chamber wherein a lower gas pressure prevails and from which the gas flows through the passages in the temperature-conditioning zone or the remaining part thereof.

Further, according to this invention, it was discovered that granular material, when conveyed over the conditioning zone by gas jets of a different temperature, undergo a rapid change in temperature due to the high gas velocity relative to the material, which sweeps the surface of the granules on all sides, since the granules tumble and thereby present continually different surfaces to the gas jets. Movement of the objects through the conditioning zone is only for the purpose of altering their temperatures, and the velocity of the solids along the table should be the minimum consistent with good relative velocity between the gas and the objects, to attain effective heat transfer and uniform or continual movement along the table surface.

The lengths of the conditioning zone and acceleration zone are selected in accordance with the temperature change desired, having regard to the difference in temperature between the material and the gas. By way of example, 40 tons per hour of foundry sand having an initial temperature of 264° F., were cooled to a temperature of 120° F., by passage on a table having a length of 30 feet, by inclined air jets having temperatures of 76° F., at jet velocities which were 160 feet per second in the first 10 feet of the table, and 110 feet per second in the immediately downstream 20 feet, resulting in the sand having a residence time of between 3 and 4 seconds on the table.

Because of time required to accelerate the granular material in the acceleration zone, the linear velocity in the conditioning zone is greater than the quotient of the table length divided by the residence time. Typical granule velocities in the conditioning zone are from 4 to 35 feet per second, and the gas is preferably emitted at velocities of 50 to 200 feet per second at a temperature 50° to 400° F. different from that of the material to provide a sheet-like current having a velocity component parallel to the table of about 35 to 170 feet per second. The residence time of the material on the table is usually between 2 and 15 seconds.

The granular material may be fed onto the feed zone of the table by any suitable means, such as a belt, which may be provided with deflectors or converging guide plates to deflect the material downwardly, a star-feeder from a chute or hopper, or a screw, etc. The belt may be related to the table as an overflow device whereby the material falls by gravity onto the feed zone substantially vertically; however, any feed device that supplies the granular material with a low forward motion may be used. Thus, the feed device may include a chute or slide element on which the granular material is slid onto the table, being preferably fanned out over the width of the table. In all of the above mentioned embodiments, it is desirable to arrange the feed device to spread the material to expose a thin, spread-out charge to the gas jets.

The temperature-conditioned material may be discharged from the downstream end of the temperature-conditioning zone of the table into a hopper or other suitable receiver, such as a bucket, truck or a moving belt. In any of these arrangements, a deflector may be provided above and downstream from the said zone to avoid over-shooting due to excessive horizontal movement of the material.

In most applications, including that to be illustrated, the table is vented at the top to the atmosphere throughout substantially its full length, and the gas, after acting on the material to accelerate it and to alter its temperature, escapes to the ambient atmosphere throughout substantially the full length of the table, or is discharged into suction intakes disposed in spaced relation to the table and distributed along its length. Thus, the invention may be practiced with installations wherein the conditioning table is closed entirely or partially at the top and suitable means are provided to draw off the spent gas into take-off ducts. In any event, the physical movement of the granular material is as a layer of granules that move in close proximity to the table surface, and no significant upward movement of the granules above said layer occurs.

The gas passages through either zone of the table may be of any suitable form, such as transverse slits, formed by slotting the table, e.g., formed of sheet metal, and depressing the downstream edges to provide upwardly inclined openings, which provides passages that produce jets inclined in the downstream direction. The longitudinal spacing of the passages is preferably such that successive jets cooperate, that is, each passage is situated no farther downstream than the distance at which the next upstream jet is effective to move a stream of gas horizontally near the table surface. In this manner successive gas jets cooperate to form a continuing layer of gas moving substantially parallel to the table surface.

In the preferred construction, more than two, e.g., up to 5–8 successive gas jets, spaced at longitudinal intervals, cooperate to produce a sheet-like gas stream flowing near the table surface with a predominantly downstream direction. As will appear in the detailed description, it is a feature of the invention that a longitudinal series of jets cooperate to produce a high-velocity current.

The table is preferably formed without protuberances, to present a continuous upper surface save for the depressed edges noted above. In this connection, the details presented in the said patents, U.S. No. 3,131,974, are incorporated herein by reference to describe a preferred construction of the temperature-conditioning zone. The table is usually wholly flat (save for the depressed edges) but may be downwardly concave in transverse cross section, i.e., to be trough-shaped. In either case, especially in the former, low side walls may be provided at the margins to prevent spillage of the material from the sides.

The feed zone or area of the table is provided to impart horizontal momentum to the material and overcome its inertia to accelerate it, so that it can be moved by the gas jets of the temperature-conditioning zone or area with only small change in forward velocity. However, as was noted before, flash cooling or heating occurs in the feed zone, and the acceleration of the granular material in this zone is of great importance in providing high relative gas velocity. To achieve the first purpose, the acceleration gas jets must have sufficient kinetic energy to accelerate the granular material and prevent the formation of a static mass within the feed zone. To attain efficient temperature change, it is desirable that there be a plurality of longitudinally cooperating gas jets upstream from the point onto which the granular material is fed, so that a well-formed current of high-velocity gas engages the material. To aid in the acceleration, it is often desirable to incline the feed area of the table downwardly toward the temperature-conditioning area, whereby gravity assists in moving the material. Usually the angle of inclination is from 15° to 35° to the horizontal. This angle is selected in accordance with the angle of repose of the material, being usually up to the angle of repose.

The kinetic energy of the jets in the conditioning zone is selected to move the granular materials at a more or less constant velocity which is best suited to achieve the maximum rate of heat transfer consistent with a minimum length of the table.

Further, the means for feeding the granular material often spreads the material over an area which is wider than that required for the temperature-conditioning zone. To permit the latter to be reasonably narrow, it is desirable to provide a feed zone or area which is wider than the conditioning zone and to converge the feed zone in the downstream direction. Suitable side walls are provided at the lateral margins of the feed zone to insure convergent flow of the material onto the conditioning zone.

The invention is further described in connection with the accompanying drawings forming a part of this specification and showing three preferred embodiments, wherein:

FIGURE 1 is a longitudinal section, taken on the line 2—2 of FIGURE 2, of a preferred embodiment;

FIGURE 2 is a plan view of the apparatus;

FIGURE 3 is an enlarged longitudinal section of a part of the table showing a preferred shape of the slit;

FIGURE 4 is a fragmentary longitudinal section of a modified form of the apparatus;

FIGURE 5 is a fragmentary view of a further modified embodiment showing an arrangement for heating objects;

Figure 6:
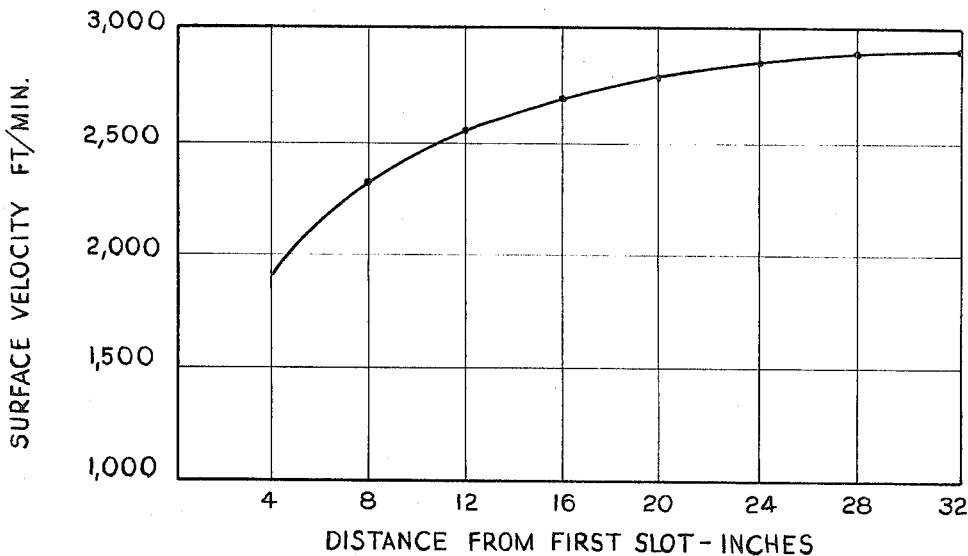
Figure 7:
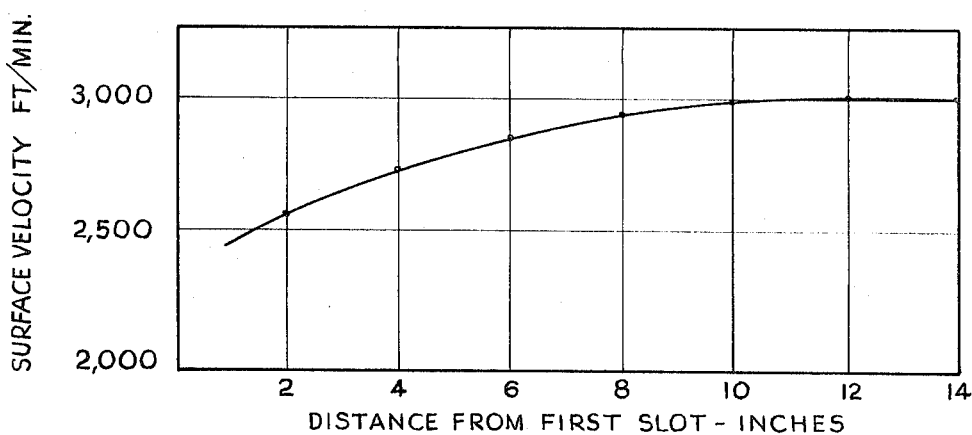

FIGURE 6 is a graph showing the relation of the horizontal component of the gas stream adjacent to the table top at successive distances downstream from the first, upstream slot, in a table wherein the slots were spaced 4 inches apart and the gas velocity through each slot was 3900 feet per minute; and FIGURE 7 is a graph similar to FIGURE 6 for a table having slots spaced 2 inches apart and providing jets of the same velocities.

Referring to FIGURES 1–3, the apparatus comprises a table 10 comprising a feed area 11 and a temperature-conditioning area 12 which is elongated and juxtaposed downstream from the feed area. The area 11 is inclined downwardly toward the area 12 and is, at its upstream end, wider than the area 11 and provided at its downstream end with converging side walls 13. The latter are joined to parallel upstream side walls 13a. The area 12 is similarly provided with side walls 14 which are joined to the walls 13. The table is provided throughout its length with gas passages 15, 16, e.g., formed as transverse slits situated at longitudinal intervals. These may be arranged in two or more rows, the slits in each row being longitudinally staggered and laterally overlapped to those of the adjacent row or rows to improve structural strength and avoid dead zones. These passages are, for example, formed when the table is of sheet metal by slitting the sheet metal and depressing the downstream portion 17 at each slit to form louvres, whereby the surfaces of the table areas 11 and 12 are each continuous and unobstructed, save for the discontinuities provided by the depressed portions 17. The portions 17 are inclined at small angles to the longitudinal line of the upper table surface, e.g., such that the average inclination is between 10° and 30°. The slits 16 are advantageously spaced apart so that longitudinally adjacent passages provide cooperating gas jets, i.e., each slit is spaced no further than the distance at which a gas jet from the next upstream passage is moving above it near to the table surface.

The passages 15 in the feed area are spaced apart longitudinally at closer intervals than the passages 16 in the conditioning area, to provide more jets and, hence, more kinetic energy of the gas jets per unit table area although all passages emit jets of like energy and direction. However, as will appear below, the jets in the feed area have higher individual kinetic energies, and the invention contemplates either one or both of these expedients. In general, the kinetic energy of a jet increases when the passage is made larger and also when gas is supplied to it at a higher pressure to produce a higher velocity and mass flow rate. Thus, it may be noted that E, the kinetic energy of one gas jet, is given by the formula $$E \text{ equals } Qv^2/2g$$

wherein $v$ is the downstream component of the jet velocity, $Q$ the weight rate of gas flow, and $g$ the acceleration of gravity. Both $v$ and $Q$ are increased by supplying gas at a higher pressure to the underside of the table.

The table is provided with a first and a second plenum chamber, situated respectively principally beneath the feed and conditioning areas. The first chamber includes side walls 18, a bottom wall 19, and upstream and downstream end walls 20 and 21; the second has side walls 22, a bottom wall 23, a downstream end wall 24, and is closed at the upstream end by the wall 21. A gas supply duct 25 communicates with the first chamber through the end wall 20 and receives a gas, e.g., air, under pressure from a compressor or blower 26 for maintaining the first chamber under super-atmospheric pressure. The wall 21 has an opening providing a passageway 27 that is fitted with a flow controller, such as a damper 28 which can be adjusted by an external handle 29. The pressure within the second plenum chamber can thereby be regulated to a desired value below that of the first chamber. In the preferred arrangement the wall 21 is situated a short distance downstream from the upstream end of the conditioning area, as shown, whereby the first few passages 16 thereof are supplied with gas at the higher pressure.

Granular material G is fed downwardly onto the feed area 11 by any suitable means, such as a conveyor belt 30, and is discharged from the downstream end of the conditioning area 12 by momentum and gravity into a receptacle or take-off conveyor belt 31. A deflector hood 32 may be provided at the discharge end to insure movement of the material onto the belt 31 without overshooting.

In the preferred construction shown, the table is open to the atmosphere throughout its length to permit the escape of gas gently and with low velocity. However, when the gas is to be recovered, a suitable hood may be used.

As was previously noted, a series of longitudinally spaced jets cooperate to produce a current of gas having a high horizontal velocity component. The cooperative effect of such jets is sown in FIGURE 6, which shows as ordinates the horizontal velocity components of air currents (parallel to the table in the downstream direction) produced by a series of slots, shaped as shown in FIGURE 3 and spaced 4 inches apart, each emitting air at a jet velocity of 3,900 feet per minute. The abscissae show distances from the first slot. It is noted that the horizontal velocity increases asymptotically to about 2,900 feet per minute. It is evident that five or more jets are required to attain a horizontal velocity component of over 2,700 feet per minute.

FIGURE 7 shows a similar graph for like slots, producing air jets of like velocities, but spaced 2 inches apart. Again there is an asymptotic increase, toward 3,000 feet per minute, but the rate of rise is greater, so that only three jets suffice to attain a velocity of 2,700 feet per minute.

It is evident from these graphs that the effect of successive jets is cumulative, and that a high velocity parallel to the table is attained only by the joint action of a plurality of longitudinally spaced jets.

In operation of the apparatus, when used to cool material such as hot sand, the material is fed onto the feed area 11 from the belt 31, or other feed means. A gas, such as air at ambient temperature, is supplied by the blower 26 to the first plenum chamber and a part of this air emerges at high velocity through the passages 15 and the passages 16 that are situated upstream of the wall 21, and the former form acceleration jets of high kinetic energy. The jets from the passage 15 aided by gravity due to the inclination of the feed area, impart to the material a horizontal velocity and cause movement onto the conditioning area 12 and effect flash cooling of the sand. It may be noted that the acceleration jets are provided through the feed area, including preferably a plurality of jets situated within the region upstream from that onto which the material falls, to permit the development of a gas current of high velocity parallel to the table and to avoid the formation of a dead space. This insures that the material is everywhere acted on by the cumulative effect of a plurality of longitudinally spaced jets, which cooperate to form a gas layer. In other words, the material falls onto a well-developed layer of moving air which has, by reason of the previously mentioned cooperative jet action (see FIGURES 6 and 7), produced a high or nearly maximum forward thrust to overcome the inertia of the fed material and therefore sweeps said material with a high relative velocity. This produces flash cooling (or heating). The converging side walls 13 deflect the material onto the narrower conditioning area.

Air flows through the passageway 27 into the second plenum chamber under control of the damper 28, whereby the second chamber is at a lower pressure. This air emerges from the passage 16 beyond the wall 21 to form temperature-conditioning jets having lower mass flow rates (for passages of like sizes) and, hence, less kinetic energy per unit table area than the acceleration jets. The successive conditioning jets cooperate to form a layer of conditioning air that moves downstream close to the table surface and from which air escapes upward. This layer moves the material rapidly along the table; however, it moves at a velocity higher than that of the material, which never achieves the velocity of the propelling and heat-transferring gases owing to the well-known phenomenon of "slip." This phenomenon is concerned with the settling velocities of particles, which have a definite terminal settling velocity related to the relative horizontal gas velocity, which must impose sufficient "drag" on the particles to maintain them in suspension. When the particles attain a velocity that approches too closely that of the gas, they settle out by gravitational force, strike the table, and are retarded; they are then again swept up by the gas. Regarding these frictional forces, reference is made to page 470 of the previously cited Fan Engineering. Therefore, the individual particles move essentially parallel to the table. In this movement individual granules bounce slightly and have impact with one another, thereby tumbling. The effect is that the gas layer sweeps all sides of the granules with a high relative velocity, typically 18 to 150 feet per second, and overcomes the boundary layer effect, and achieves rapid and uniform heat exchange.

*Example*

In a specific example the table had a conditioning area 30 feet long and 24 inches wide, provided with gas passages formed as transverse slits spaced 2 inches apart, each slit being 6 inches long and providing a vertical gap between the depressed portions 17 and the underside of the table of 0.060 inch. Sand at a temperature of 290° F. was supplied at a rate of 1500 pounds per minute, and air at 37° F. was supplied to both the plenum chambers via the upstream chamber at a rate of 6000 s.c.f.m. (standard cubic feet per minute) and a pressure of 8 inches of water. The air entered the downstream plenum chamber to produce a pressure of 5 inches of water. These pressures produced jets having velocities of 10,000 feet per minute, in the section upstream from the wall 21 and 7000 feet per minute, in the section downstream from said wall. The sand was in contact with the air jets in both sections for a period of between 3 and 4 seconds and was, during this period, cooled to 44° F.

By way of comparison, sand at the same temperature and feed rate, cooled to the same temperature of 44° F. by the conventional technique of air-blowing upwards through a fluidized bed of sand, on a vibratory conveyor, required between 10 and 15 minutes to attain equilibrium. This conventional technique is evidently very time-consuming and, therefore, requires equipment of large size for a given throughput.

Referring to FIGURE 4, there are shown two modifications which may be applied individually. First, it includes a different feed arrangement, consisting of a standpipe 33, which may be supplied by a hopper, and a star feeder 34, which supplies the granular material to the feed area 35 of the table, the said feed arrangement replacing the belt 30. Secondly, the feed area 35 is horizontal and co-planar with the conditioning area 12 of the table. All other parts may be constructed and used as previously described and like reference numbers denote like parts. In this arrangement, the granular material is swept off the acceleration zone by the gas current formed by the passages 36 up-stream therefrom onto the conditioning zone of the table solely by the acceleration jets which emanate at the closely spaced passage 36, unaided by gravity.

FIGURE 5 shows a modification of the gas supply system suitable for use when the material is to be heated or cooled and the gas is supplied at an unsuitable initial temperature. The compressor or blower 37 supplies gas, e.g., air, to a duct 38, which discharges to the heating coil 39 of a furnace 40, and the heated gas is conducted under suitable pressure via the duct 41 to the first plenum chamber. Other parts are constructed and operated as previously described and like reference numbers denote like parts.

Although certain specific features were shown, the invention is subject to numerous variations. Thus, the table need not be flat or horizontal, and it may be constructed in accordance with any of the variations described in the aforesaid U.S. Patent 3,131,974. Also the passages need not be formed as slits, but other forms of passages may be used. Similarly, the furnace 40 of FIGURE 5 may be replaced by a heat exchanger which refrigerates the gas.

Similarly, it is convenient, but not essential, to provide gas from a single source and to supply air to the second plenum chamber from the first plenum chamber.

I claim as my invention:

1. Method of changing the temperature of granular material which comprises the steps of:
    (a) feeding said granular material onto the feed zone of a conveyor table which includes an elongated temperature-conditioning zone juxtaposed downstream from said feed zone, both said zones having a multitude of longitudinally spaced passages extending there-through and inclined to the table in a common downstream direction;
    (b) imparting to said material on said feed zone a horizontal momentum toward said conditioning zone by flowing gaseous acceleration jets through the said passages in the feed zone of said table with strong downstream components, said jets having temperatures materially different from the temperature of said material, thereby moving said material onto said conditioning zone;
    (c) propelling said material downstream on said temperature-conditioning zone and changing the temperature thereof by projecting through said passages in the temperature-conditioning zone of said table a multitude of temperature-conditioning jets having temperatures materially different from the temperature of said material, the principal flow components of said conditioning jets being in said downstream direction, and
    (d) controlling the flow of said jets so that the kinetic energy of said downstream components per unit area of the conveyor table is less in the conditioning zone than in the feed zone.

2. Method as defined in claim 1 wherein said feed zone of the table is inclined downwardly toward said conditioning zone, whereby the force of gravity assists the acceleration of the material, and said conditioning zone of the table is substantially horizontal in the said downstream direction.

3. Method as defined in claim 1 wherein said feed zone is, at least in part, wider than said conditioning zone, and the said material is moved laterally converging onto said conditioning zone.

4. Method as defined in claim 1, wherein said gas jets are produced by supplying gas under pressure to the underside of the table, the gas being supplied to the feed zone at a pressure greater than the pressure at which it is supplied to the temperature-conditioning zone.

5. Method as defined in claim 1, wherein at least the jets in the feed zone are longitudinally spaced sufficiently near each other so that each jet emerges from the table under another jet that emerged from a point farther upstream and is flowing near to the table and said granular material is fed onto the feed zone at a location thereon such that there is a plurality of longitudinally spaced jets upstream from said location, whereby said gas current has a high velocity component parallel to the table before engaging the material.

6. Method as defined in claim 1, wherein:
 (a) the initial temperature of said granular material is between 50° and 500° F. higher than that of the conditioning jets; and
 (b) said material is moved downstream on said conditioning zone with a linear velocity between about 4 and 35 feet per second said said zone has a length to maintain said material within the zone for a period between 2 and 15 seconds.

7. Apparatus for changing the temperature of granular material which comprises:
 (a) a table formed with a multitude of gas passages extending therethrough and inclined generally in a common downstream direction, said table including a feed area at one end and a longitudinally elongated conditioning area juxtaposed to the feed area;
 (b) means for feeding said granular material only onto a location on said feed area situated downstream from a plurality of longitudinally spaced passages for forming upstream from said location a gas sheet having a high velocity component parallel to the table;
 (c) first and second plenum chambers respectively beneath said feed and conditioning areas including enclosing walls and bounded at the top by said table; and
 (d) means for supplying gas under pressure to said plenum chambers at a temperature materially different from that of said material for discharge through said gas passages to form acceleration jets of high kinetic energy in the feed area and temperature-conditioning jets in the temperature-conditioning area, including means for regulating the flow of the gas to make the kinetic energy of the downstream components of the conditioning jets per unit area of the table less than the downstream components of the acceleration jets per unit area of the table.

8. Apparatus as defined in claim 7, wherein said feed area of the table is inclined downwardly toward the conditioning area.

9. Apparatus as defined in claim 7 wherein said feed area of the table is wider at the upstream end thereof than said conditioning area and converges to substantially the latter width in a downstream direction, said feed zone having upstanding, lateral guide walls.

10. Method of changing the temperature of granular material which comprises the steps of:
 (a) forming a gas current having a major velocity component parallel to a conveying table by flowing a multitude of gas jets upwards through a conveyor table at small inclinations to said table in a common downstream direction, said jets being spaced apart longitudinally and being sufficiently close together so that each jet emerges from the table under another jet that emerged from a point farther upstream,
 (b) feeding said granular material onto said conveyor at a temperature materially different from that of said jets and at a location such that there is a plurality of longitudinally spaced jets upstream from said location, whereby said gas current has a high velocity component parallel to the table before engaging the material, and
 (c) accelerating said material and altering the temperature thereof by said gas sheet, thereby moving the material downstream along said table.

References Cited by the Examiner
UNITED STATES PATENTS

| | | | |
|---|---|---|---|
| 1,019,958 | 3/1912 | Hannam et al. | 34—57 |
| 1,802,960 | 4/1931 | Simonds | 34—57 |
| 1,971,853 | 8/1934 | Ihlefeldt | 302—31 X |
| 2,371,619 | 3/1945 | Hartley | 34—57 |
| 2,904,323 | 9/1959 | Cova et al. | 34—57 |
| 3,012,331 | 12/1961 | Oholm et al. | 34—57 |
| 3,112,186 | 11/1963 | Davis et al. | 34—10 |
| 3,131,974 | 5/1964 | Futer | 302—31 |

FREDERICK L. MATTESON, Jr., *Primary Examiner.*
JOHN J. CAMBY, *Examiner.*